United States Patent Office 2,695,834
Patented Nov. 30, 1954

2,695,834

PROCESS OF REACTING UNSATURATED COMPOUNDS WITH INORGANIC ACID COMPOUNDS AND PRODUCTS RESULTING THEREFROM

Willem Leendert Johannes De Nie, South Croydon, England, assignor to Shell Development Company, San Francisco, Calif., a corporation of Delaware No Drawing. Application March 15, 1948, Serial No. 15,048

Claims priority, application Netherlands June 26, 1947

9 Claims. (Cl. 18—54)

This invention relates to a process by which mixtures of both high and low molecular weight unsaturated compounds are reacted with inorganic acidifying compounds to form useful reaction products, the invention being particularly directed to a method for promoting or accelerating the foregoing reaction. The invention also relates to the resulting products.

The term "high molecular weight unsaturated compounds," as employed herein, embraces those compounds having a molecular weight of at least 5,000 which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, or from its homologues and derivatives, with other unsaturated organic compounds. Among the latter are the olefins, as isobutylene which copolymerizes with butadiene to form butyl synthetic rubber; the vinyls, as vinyl chloride, acrylic acid, acrylonitrile (which polymerizes with butadiene to form the synthetic rubber Buna N), methacrylic acid, and styrene, the latter compound copolymerizing with butadiene to form the synthetic rubber Buna S; as well as the vinyl esters and various unsaturated aldehydes, ketones and ethers, as acrolein, methyl isopropenyl ketone, and vinyl ethyl ether.

The above-defined, unsaturated, high molecular weight materials may also properly be termed "multiple-unsaturated, high molecular weight polymers," or "multiple-unsaturated, high molecular weight polymers of diene-hydrocarbons." Alternatively, these high molecular weight, polyunsaturated materials, including both natural as well as synthetic rubbers, may be defined as "rubbery polymers of at least one compound selected from the group consisting of the conjugated diolefins and chloroprene."

Among the unsaturated high molecular weight compounds, those which find preferred usage in the practice of this invention are the rubbers, particularly the natural rubbers and those comprised of butadiene polymers.

The term "low molecular weight unsaturated compounds" is employed herein to designate those compounds which contain aliphatic unsaturation between one or more pairs of adjacent carbon atoms, and which have a molecular weight of below 5000 and which generically does not exceed 1000. Included within this term are the various olefins, diolefins and acetylenes, as well as those compounds of this type which are substituted by one or more polar groups. Representative polar substituents are the halogens and the OH, NH$_2$, NH, NCONH$_2$, NCSNH$_2$, SC(NH$_2$)$_2$, NCO, NCS, SCN, NSO, OOC (alkyl or aryl) and O(alkyl or aryl) groups.

Illustrative examples of unsubstituted, low molecular weight unsaturated compounds are 1-butene, 2-butene, 1-pentene, 1-hexene, 1-heptene, 1-dodecene, 1-tetradecene, cyclopentene, cyclohexene, 1,3-butadiene, 1,3-pentadiene, 1,5-hexadiene (diallyl), 2 - methyl - 1,3 - butadiene (isoprene), diisobutenyl, 1-butyne, divinyl acetylene, and the like.

Representative substituted, low molecular weight unsaturated compounds are allyl alcohol, crotyl alcohol, 1,5-hexadiene-3-ol, propargyl alcohol, allyl chloride, 2-chloro-1,3-butadiene, allyl amine, 5-dimethylamino-1-pentene, allyl isocyanate, N-allyl-N'-phenolthiourea, N-allyl thiourea, S-allyl-N,N'-diphenylisothiourea, allyl isothiocyanate, allyl thiocyanate, thionyl allylamine, allyl acetate, allyl capronate, allyl oleate, diallyl phthalate, diallyl adipate, dipropenyl glutarate, dipropenyl phthalate, diallyl sebacate, diallyl malonate, allyl ethyl ether, and diallyl ether.

Among the low molecular weight unsaturated compounds, a preferred group for the purposes of this invention is that made up of the various olefinic hydrocarbons, halides, alcohols and esters. A still more preferred class of low molecular weight compounds is made up of the allyl halides, alcohols, and esters.

Many of the low molecular weight unsaturated compounds mentioned above are capable of ready polymerization and frequently are available only in the polymerized or partially polymerized condition. Accordingly, the term "low molecular weight unsaturated compounds" is also meant to include not only the unsaturated monomers, but also those unsaturated polymers and part polymers thereof whose molecular weight is less than 5,000.

As employed herein, the term "inorganic acidifying compound" embraces the various inorganic acids and acid anhydrides wherein the acid-forming element (as sulfur, nitrogen or phosphorus, for example), if possessing several valencies, is present in a valency other than the highest thereof. Particularly suitable acidifying compounds are the acid anhydrides sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the most preferred compound for employment in the present invention is sulfur dioxide.

It is known that the high molecular weight unsaturated compounds lend themselves well to the production of various shapes, including those of a continuous, non-supported nature, as filaments, rods, strips, sheets, and the like. Processes of this nature are set forth in detail, for example, in U. S. Patents No. 2,185,656, issued January 2, 1940, No. 2,198,927, issued April 30, 1940 and No. 2,288,982, issued July 7, 1942, and reference is hereby made to the said patents for a more complete disclosure of the methods there described. Furthermore, it is known that the properties of such shapes may be improved by reacting the unsaturated, high molecular weight compound with one or more of the inorganic acidifying compounds mentioned above, particularly sulfur dioxide. In making filaments or other continuous shapes of such reaction products, the conventional practice is to inject a solution of the high molecular weight component into a coagulating bath wherein the acidifying reactant is present in solution. There the injected material reacts with the dissolved acidifying compound, as sulfur dioxide, to form a product which is insoluble in the surrounding solution. When producing shapes in this manner it is of great importance that the reaction proceed as rapidly as possible, for the objects formed in the bath remain therein for but a few seconds or even less under normal operating conditions. Further, while it is important that the reaction proceed rapidly to its conclusion, the extent of the reaction should also be as great as possible, i. e., the unsaturated, high molecular weight compound should react with and retain relatively large amounts of inorganic acidifying compound. U. S. Patent No. 2,265,722, issued December 9, 1941, discloses a method for accelerating the reaction between unsaturated high molecular weight compounds and those of an inorganic acidifying nature, such acceleration being obtained by carrying on the reaction in the presence of aliphatic, cyclic or aliphatic-cyclic compounds containing ether-like bound oxygen atoms, exemplary compounds being diethyl ether, diisopropyl ether, vinyl ethyl ether, pentamethylene oxide, methyl propane methylene dioxide, ethene methylene dioxide, paraldehyde, dioxane and diethyl acetal, and reference is hereby made to said patent for a more complete description of the procedure there disclosed.

The exact nature of the reaction between unsaturated high molecular weight compounds and inorganic acidifying compounds is not clearly understood. However, it is evident that a quantity of the acidifying ingredient is evidently taken up in one form or another by the high molecular weight reactant. The extent of this reaction is normally measured by, and expressed in terms of, the amount of acid-forming element (sulfur, phosphorus or nitrogen, for example) present in the resulting reaction product. Whatever its nature, the reaction is an extremely slow one under normal conditions, and if materials of high purity be used, substantially no reaction at all occurs in most instances.

While reaction of the unsaturated high molecular weight compounds with inorganic acidifying substances provides materials having greatly improved properties as compared with the unreacted compound, considerable room for improvement even in the acid-reacted product still exists. For one thing the reaction product is difficult to color with the commonly employed dyestuffs. Further, the presently available reaction products have a decided tendency to deteriorate with age or under what may be termed accelerated aging conditions, as exposure to heat or actinic light. This deterioration is accompanied by a gradual loss of the acidifying ingredient present (as sulfur dioxide), and is manifested by a rapid deterioration in the physical properties of the article, the tensile strength, for example, falling off sharply.

It is therefore an object of this invention to provide an improved material of the type which heretofore has been derived from unsaturated, high molecular weight compounds whether reacted or unreacted with inorganic acidifying compounds. A more particular object is to provide a material incorporating a high molecular weight, unsaturated component, which material may be reacted with an acidifying compound to produce reaction products characterized by a ready receptivity to conventional dyestuffs and by a high degree of stability.

Another object of the invention is to provide a method for effecting an extremely rapid and complete reaction between one or more inorganic acidifying compounds, on the one hand, and a mixture of unsaturated compounds of both high and low molecular weights, on the other. Other objects of the present invention will become apparent as the description proceeds.

It has now been discovered that a mixture containing unsaturated compounds of both high and low molecular weight may be quickly reacted with relatively large proportions of one or more inorganic acidifying compounds provided the unsaturated compounds have been activated by treatment with one or more oxygen-yielding substances. The term "oxygen yielding substances" as employed herein is intended to include the various organic and inorganic peroxides, as well as free oxygen itself in one form or another. The resulting reaction products may readily be dyed in any desired shade or color with the conventional dyestuffs. Further, the reaction products are age-resistant, strong, durable, resilient, and if desired, highly non-inflammable and/or water-absorptive.

When free oxygen or ozone is introduced into either a high- or a low-molecular weight unsaturated compound of the type employed herein when the latter is present in either the solution or the liquid state, the reactivity of said unsaturated compound towards an inorganic acidifying compound is increased. For example, some activation is obtained when air is blown for several hours through a solution of natural rubber or butadiene polymer, or through an olefinic type of compound, as diallyl phthalate or allyl acetate. However, this practice is not one of general application since the activated compounds produced in this manner have a relatively limited capacity to react with inorganic acidifying compounds, and much better results are obtained through use of a peroxide additive.

The various peroxides which are useful as activators for the unsaturated reactants may be grouped into two classes. The first class comprises those compounds having the structure R—O—O—H, where R is a member selected from the group consisting of hydrogen or an organic or inorganic radical. Representative compounds falling within this group are tetrahydronaphthalene hydroperoxide, (tetralin hydroperoxide), peracetic acid, perbenzoic acid, tertiary butyl hydroperoxide, hydrogen peroxide, persulfuric acid, percarbonic acid, perboric acid, cyclohexene hydroperoxide, octahydroanthracene hydroperoxide (octracene hydroperoxide), decahydronaphthalene hydroperoxide (decalin hydroperoxide), perhydroanthracene hydroperoxide, methylcyclohexene hydroperoxide and ethylbenzene hydroperoxide.

The second group of peroxide compounds which are useful in carrying out the present invention is made up of those having the formula $R_1$—O—O—$R_2$, wherein $R_1$ and $R_2$ represent organic or inorganic radicals other than the hydrogen atom. Examples of compounds falling within this group are acetyl peroxide, ascaridol, benzoyl peroxide, ditertiary butyl peroxide, ethyl perether of tetralin, and the sodium or potassium salt of persulfuric, percarbonic and perboric acids. Of these various compounds, that which generally finds preferred usage is benzoyl peroxide. The peroxides falling within this group are effective activating agents only in the presence of one or more of the ethereal compounds described in U. S. Patent No. 2,265,722, to which reference has been made above, suitable compounds of this type being diethyl ether, vinyl ethyl ether, pentamethylene oxide, methyl propene methylene dioxide, ethene methylene dioxide, paraldehyde, dioxane, diisopropyl ether and diethyl acetal, the last three compounds named being of preferred usage.

In carrying out the process of the present invention it is preferable to activate both the high and low unsaturated high molecular weight reactants with a peroxide of the hydroperoxide (R—O—O—H) variety, and a particularly preferred group of hydroperoxides is made up of the compounds decalin hydroperoxide, tetralin hydroperoxide, and ethylbenzene hydroperoxide.

The high and low molecular weight unsaturated compounds may be activated by the peroxide (together with the ethereal compound if necessary) either separately or in admixture. Further, this activation may be carried out either prior to the reaction with the inorganic acidifying compound or, in the case of the hydroperoxide, simultaneously therewith. Preferably, however, the peroxide is added directly to each of the unsaturated compounds, or to the mixture thereof, before reaction with the acidifying compound is initiated, for in this way activation of all portions of the unsaturated reactants is assured.

The unsaturated compounds of either high or low molecular weight may be activated by the oxygen-yielding substance when said compounds are in either the dissolved, swollen, or solid state. Preferably, however, said compounds are first placed in solution and the peroxide (either with or without a compound of the ethereal type) is added thereto. As representative solvents for both high and low molecular weight unsaturated compounds there may be mentioned octane, benzene, dioxane or ethyl acetate. A particularly convenient practice is to employ a low molecular weight unsaturated reactant which itself is liquid at the reaction temperatures normally employed (0° C. ± 20°) and is a solvent for the high molecular weight, unsaturated component. Representative low molecular weight unsaturated reactants having such characteristics are dichloroethene, 1,3-pentadiene, vinyl acetate and cyclohexene. Again, when an ethereal compound is to be employed with the particular peroxide to be used, as benzoyl peroxide, the ethereal compound chosen may be one such as dioxane or diisopropyl ether which, either alone or in conjunction with one or more other compounds as benzene or cyclohexene serves as a solvent for the high and/or low molecular weight, unsaturated reactants.

When unsaturated compounds of either high- or low-molecular weight are to be reacted in the swollen state, i. e., in the presence of solvent in quantity insufficient to effect solution, activation is brought about either by adding the peroxide to the already swollen product, as a thread, filament or the like, or by first adding the peroxide to the solvent before the latter is introduced into the material, as by a soaking step. Suitable swelling agents for this purpose are the solvents mentioned above, as benzene, dioxane, or cyclohexene, together with such other known swelling agents as tricresyl phosphate and the various high boiling petroleum fractions and extracts.

It is difficult to set particular limits on the proportions of peroxide to be used with either the high- or the low-molecular weight unsaturated compounds. For example, a quantity of as little as 0.1% by weight of tetralin peroxide or benzoyl peroxide (based on the weight of the high- or the low-molecular weight compound or on the total weight thereof, as the case may be) will often serve to activate such materials as butadiene polymers, natural rubbers and the allyl esters to such an extent that they will react with substantial quantities of sulfur dioxide or other acidifying compound to form a highly desirable type of reaction product. On the other hand, it is preferred that from 1 to 35% of the peroxide activating agent be used, and particularly good results have been obtained with the addition of from 10 to 20% thereof, these percentages again being expressed in terms of the weight of the unsaturated components undergoing activation by the peroxide.

Likewise, no fixed limit may be set with reference to the amount of ethereal ingredient to employ in the case of peroxides having the $R_1$—O—O—$R_2$ structure, but it is customary to employ a solvent for the unsaturated reactants which is either made up entirely of this ingredient or contains a substantial percentage thereof.

Whatever the procedure adopted for bringing the oxygen-yielding activating agent into engagement with the unsaturated reactants, said activation is readily achieved at room temperatures and under normal atmospheric conditions. In the case of peroxides having the structure R—O—O—H, the desired activation of either the low- or the high-molecular weight unsaturated compound, or of a mixture or solution containing both thereof, is completed in but a very brief interval, as a fraction of a second. In the case of perbenzoic acid the full effect of the activation treatment may not be attained until after several hours, but appreciable activation will ensue in the shorter interval. With peroxides having a structure $R_1$—O—O—$R_2$, on the other hand, activation of the unsaturated reactants is effected at a much slower rate and generally requires periods of from several hours to many days. Somewhat shorter times than this can be used if the temperature of the material being activated is raised substantially above room temperature, as to from 50 to 100° C., but it is preferred to effect the activation below 50° C., particularly in the case of the high molecular weight unsaturated reactants.

The low molecular weight unsaturated compound or several such compounds together, may be admixed with one or more high molecular weight unsaturated compounds in proportions which may vary over a wide range. For example, the use of as little as 5 or 10% of the low molecular weight compound, based on the weight of high molecular weight compound present, will materially improve the properties of the resulting reaction product with acidifying compound as compared with those of the reaction product which would have been obtained without the use of the low molecular weight reactant. On the other hand, the use of mixtures containing as much as 300 or 400% of the low molecular weight compound will also result in the formation of materials having outstanding properties on reaction with sulfur dioxide or its equivalent. In this connection it should be observed that the proportions in which the high- and low-molecular weight reactants are initially admixed is not necessarily determinative of their relative percentages in the final reaction product with the acid compound. This is because these reactants generally combine to form a new molecular association of unknown structure with the sulfur dioxide or other acidifying compound employed. While it is also possible for each of the high and low molecular weight compounds to react separately with the sulfur dioxide or other acidifying compound to form a mixture of two reaction products, here again the amount of low molecular weight compound which will be taken up in the final product is largely dependent on the amount of the high molecular weight reactant present, and to a lesser extent on the available supply of inorganic acidifying ingredient. Accordingly, while the recommended practice is to employ a quantity of the low molecular weight unsaturated reactant which is at least equal to the weight of high molecular weight unsaturated reactant present, the final reaction product of both high and low molecular weight materials with the inorganic acidifying compound normally contains a relatively smaller proportion of the low- than of the high-molecular weight component.

Unsaturated high- or low-molecular weight compounds, or mixtures thereof, activated by treatment with peroxides or with peroxides in the presence of ethereal compounds, are well adapted to react with inorganic acidifying compounds, particularly sulfur dioxide. Despite the great variety of these high- and low-molecular weight compounds and the natural reluctance of many of them to combine with acidifying materials, the activation treatment here disclosed effectively imparts the desired reactive qualities to each compound. In many cases, particularly when sulfur dioxide is the acidifying reactant, the resulting reaction product on analysis will be found to contain high percentages of the acid-forming element, e. g. 20 to 30% by weight sulfur. However, filaments or other shapes produced from such reaction products are not brittle, but are flexible and have a high tensile strength.

The conditions under which the reaction with acidifying compounds may take place can be widely varied. For example, when sulfur dioxide is introduced in either the gaseous, liquid or dissolved state into a solution of activated material, as butadiene polymer or natural rubber together with diallyl phthalate in a solvent such as dioxane or benzene, a gel-like reaction product is obtained which can either be dried into a sheet or film, or used in the liquid condition in finishes of one type or another. On the other hand, when solutions of the activated material are injected or otherwise introduced into a bath containing sulfur dioxide dissolved in a liquid, as a water-alcohol mixture, in which the resulting reaction product is insoluble, there are precipitated semi-solid reaction products such as threads, filaments, rods and the like. Again, the reaction may take place when sulfur dioxide, in the gaseous, liquid or dissolved state is brought into contact with sheets or deposited layers of the activated material from which all sulfur has not been evaporated. It is characteristic of all the foregoing reaction products that they may readily be dyed with the conventional dyestuffs, as the acetate, acid or acid-wool dyes. Further, these products manifest a high degree of resistance to deterioration with age.

Having described the present invention in its more general aspects, the following examples are supplied as illustrative of preferred embodiments thereof:

*Example I*

To 100 parts of a 6.5% solution of natural rubber in a solvent made up of equal parts by volume of benzene and toluene was added 13 parts of diallyl (1,5-hexadiene). The dissolved rubber and diallyl were then activated by the addition to the solution of approximately three parts of tetralin hydroperoxide, a quantity equal to 15% of the combined weight of the rubber and diallyl present in the solution. The solution was then immediately injected into a water-ethanol (1:4 by volume) coagulating bath containing 300 gr. of dissolved sulfur dioxide per liter and maintained at —5° C. The injected solution instantly reacted with the sulfur dioxide to form an insoluble thread-like product, and these threads on being washed with ethanol and dryed, proved to have a sulfur content of 26%, an abnormally high, though desirable percentage. They were flexible, had excellent tensile strength characteristics, and were readily dyed by a wide variety of basic colorants.

For the sake of comparison, a rubber solution prepared in the same manner as described above and activated by 15% tetralin hydroperoxide (based on the weight of rubber present), but without the addition of any diallyl, was spun into threads in the same coagulating bath and under the identical conditions as described in the preceding paragraph. In this case the washed and dried threads proved to contain but 21.6% sulfur and they were difficult if not impossible to dye with any of the conventional dyestuffs. The tensile strength of these threads was well below that of those which were made up of the rubber-diallyl-$SO_2$ reaction product. It should be noted that no threads at all were formed when a diallyl solution activated by tetralin hydroperoxide was introduced into the sulfur dioxide-containing coagulating bath.

*Example II*

In this case a 6.5% solution of natural rubber in a solvent made up of equal parts by volume of benzene and toluene was prepared and divided into four equal volumes.

To one volume of this rubber solution was then added approximately 15% tetralin hydroperoxide (based on the weight of rubber present) and the resulting solution was then immediately extruded, or spun, into the coagulating bath described in Example I. The resulting filaments after being washed in ethanol and dried had a total weight of 4.2 kg. They were opaque and could be dyed only with difficulty.

To a second volume of this rubber solution there was then added an amount of diallyl phthalate equivalent to 200% of the weight of rubber present and an amount of tetralin hydroperoxide equivalent to 15% of the combined weight of the rubber and diallyl phthalate. The resulting solution, on being injected into the sulfur dioxide-containing coagulating bath of Example I, yielded a total of 6.5 kg. of washed and dried threads as compared with 4.2 kg. obtained without use of the diallyl phthalate reactant. Surprisingly, the diallyl phthalate-containing threads were transparent, yet could be readily dyed. They had excellent tensile strength as well as other desirable physical properties.

*Example III*

To a third volume of the rubber solution described above in Example II, the first paragraph, was added allyl acetate in an amount equal to 50% of the weight of rubber present and tetralin peroxide in amount equivalent to 15% of the combined weight of rubber and allyl acetate present. This solution, on being spun into threads in the sulfur dioxide-containing coagulating bath employed in the foregoing examples, yielded 5.5 kg. of ethanol-washed, dried threads which proved to have a ready acceptance for the conventional acetate and other colorants, and which had good tensile strength and other desirable physical characteristics.

*Example IV*

To the last of the equal volumes of the rubber solutions prepared as described in Example II above was added 100% of allyl alcohol, based on the weight of rubber present, and 15% of tetralin hydroperoxide, the latter figure again being based on the combined weight of rubber and allyl alcohol in the solution. This solution, on being spun into the $SO_2$-containing coagulating bath yielded 8.7 kg. of the washed, dried threads, or filaments. While this reaction product thus contained a relatively larger proportion of the low molecular weight unsaturated reactant (allyl alcohol) than was the case in the foregoing examples, nevertheless these filaments proved satisfactory in every respect and, in particular, could be dyed more satisfactorily with acid wool dyes than could threads obtained from rubber, but without any allyl alcohol, under otherwise similar circumstances.

*Example V*

Filaments may be produced from a solution of 6% butadiene polymer (molecular weight approximately 50,000) in the equal parts by volume of dichloroethene and dioxane, activated through the addition of benzoyl peroxide in amount equal to 15% of the combined weight of the butadiene polymer and dichloroethene present (the solution being allowed to stand for a period of several days). The filaments obtained by injecting the resulting activated solution into a sulfur dioxide-containing coagulating bath, as that described in Example I above, have a relatively high sulfur content, are readily colored by the conventional dyestuffs, are resistant to deterioration with age, and otherwise exhibit good physical properties, including resiliency and high tensile strength.

The various parts and percentages expressed herein are by weight unless otherwise indicated.

I claim as my invention:
1. A synthetic filament characterized by an unusually good acceptance of dyestuffs, which filament is produced by spinning a liquid containing (1) a hydroperoxide, (2) a rubbery polymer of a compound selected from the group consisting of the conjugated diolefins and chloroprene, and (3) a quantity of at least 10%, based on the weight of rubbery polymer present, of a compound of low molecular weight (below 5,000) which contains an olefinic double bond between at least one pair of adjacent carbon atoms, into a coagulating bath containing available sulfur dioxide wherein the rubbery polymer and the low molecular weight compound react with the sulfur dioxide to form an insoluble filamentary product which is then withdrawn from the coagulating bath.
2. The filament of claim 1 wherein the rubbery polymer is a synthetic, rubbery, butadiene polymer.
3. The filament of claim 1 wherein the rubbery polymer is a natural rubber.
4. The filament of claim 1 wherein the rubber polymer is a natural rubber and the low molecular weight compound is an olefinic ester.
5. The filament of claim 1 wherein the rubbery polymer is a natural rubber and the low molecular weight compound is an olefinic alcohol.
6. The filament of claim 1 wherein the rubbery polymer is a natural rubber and the low molecular weight compound is an olefinic hydrocarbon.
7. The filament of claim 1 wherein the rubbery polymer is a natural rubber and the low molecular weight compound is diallyl phthalate.
8. The filament of claim 1 wherein the rubbery polymer is a natural rubber and the low molecular weight compound is 1,5-hexadiene.
9. The filament of claim 1 wherein the rubbery polymer is a natural rubber and the low molecular weight compound is allyl alcohol.

References Cited in the file of this patent

UNITED STATES PATENTS

| Number | Name | Date |
|---|---|---|
| 1,925,879 | Oenslager | Sept. 5, 1933 |
| 2,113,584 | Fitch et al. | Apr. 12, 1938 |
| 2,169,363 | Marvel et al. | Aug. 15, 1939 |
| 2,288,982 | Waterman | July 7, 1942 |
| 2,293,023 | Hills et al. | Aug. 11, 1942 |
| 2,379,354 | Hilton | June 26, 1945 |
| 2,383,055 | Fryling | Aug. 21, 1945 |
| 2,422,550 | Jacobson | June 17, 1947 |
| 2,469,847 | Rumscheidt et al. | May 10, 1949 |